United States Patent
Lo

[19]

[11] Patent Number: 5,822,338
[45] Date of Patent: Oct. 13, 1998

[54] ECC-COMPARE PATH OF CACHE DIRECTORY LOGIC IMPROVEMENTS

[75] Inventor: Tin-Chee Lo, Fishkill, N.Y.

[73] Assignee: International Business Machines Corporation, Armonk, N.Y.

[21] Appl. No.: 14,503

[22] Filed: Jan. 28, 1998

[51] Int. Cl.$^6$ .................................................. G06F 11/00
[52] U.S. Cl. ......................................................... 371/40.12
[58] Field of Search ............................... 371/40.12, 21.1, 371/21.2, 25.1; 365/201; 395/185.03, 185.01

[56] References Cited

U.S. PATENT DOCUMENTS 5,659,551 8/1997 Huott et al. .
5,661,732 8/1997 Lo et al. .

OTHER PUBLICATIONS

"Pseude–Cache–Based Architecture" IBM Technical Disclosure Bulletin, vol. 34, No. 7A, Dec. 1991, pp. 481–485.
"Pipelined Cache Design for High Reliability" IBM Technical Disclosure Bulletin, vol. 37, No. 7, Jul. 1994, pp. 73–79.

"Associative Scheme for Cache Coherence in Multi–Processors" IBM Technical Disclosure Bulletin, vol. 39, No. 5, May 1996, pp. 153–156.

*Primary Examiner*—Vinncet P. Canney
*Attorney, Agent, or Firm*—Lynn L. Augspurger

[57] ABSTRACT

Directory compare and ECC logic which is interfaced with the array's static and dynamic outputs for the ECC-compare path of a cache directory, using a three-output array providing a static output and a pair of complementary dynamic outputs. The static output is useed by the compare logic for a directory compare. The pair of complementary dynamic outputs provide dynamic signals (t and f) to drive the ECC logic only as ECC logic complementary signals which are coupled to drive a DCVS (Dynamic Cascode Voltage Switch) syndrome generator circuit. The static output signal performs compare-then-correct processing. The dynamic signals of each bit emanating from array are ECC checked but the static signal is not. The static signal is consistent with the t dynamic signal.

4 Claims, 7 Drawing Sheets

ECC-COMPARE PATH OF CACHE DIRECTORY LOGIC IMPROVEMENTS

FIELD OF THE INVENTION

This invention is related to ECC-compare path of cache directory logic improvements particularly for ECC correction and compare logic which is interfaced with the array's static and dynamic outputs.

BACKGROUND OF THE INVENTION

Figure 1:
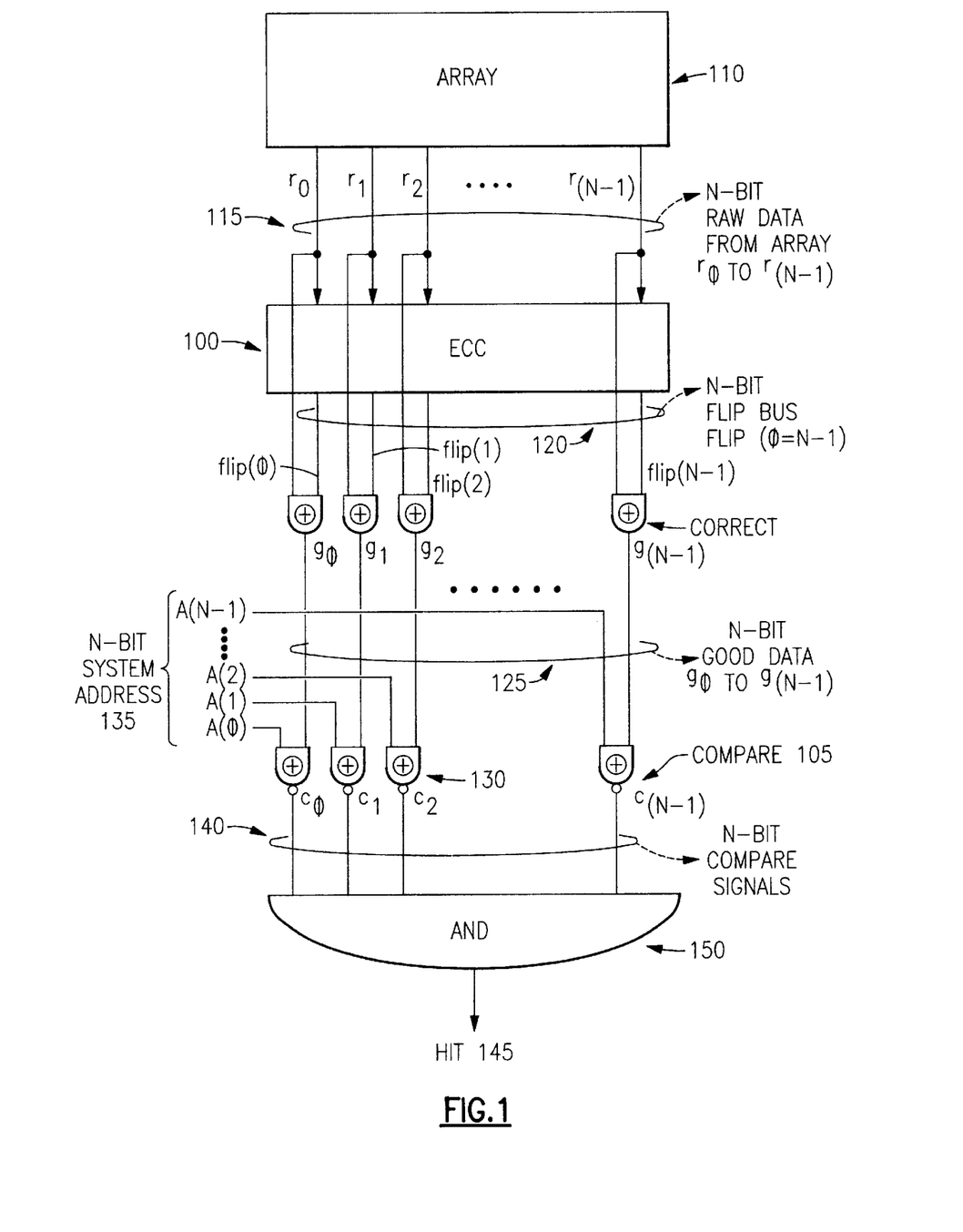
FIG. 1 illustrates directory compare logic with ECC using the conventional logic for correct-then-compare method.

FIG. 1 shows the conventional design of the ECC (error-correction-code) logic 100 and the compare 105 function used in cache directory logic with "correct-then-compare" logic. The on-chip array (e.g. SRAM) 110 has an N bit output bus 115. These N bits are inputs to the ECC logic 100. Because these inputs are signals prior to ECC correction, they are "raw" data labeled r(0:N−1) on the bus from the array array 110. The ECC logic 100 produce "flip" signals 120 to make necessary corrections to the raw bus and produce a set of "good" signals g(0:N−1) of the good data bus 125. The good data bus 125 is compared via exclusive-OR gates 130 with the system address bus 135 labelled as A(0:N−1). Having completed this "correct-then-compare" process, every bit position is examined. If each and every bit position compares as indicated by c(0:N−1) 140, a HIT signal 145 is generated via an AND gate 150.

The generation of good data g(0:N−1) 125 with "correct-then-compare" logic is a time consuming process. It would be desirable to improve this.

SUMMARY OF THE INVENTION

The invention provides for an improvement by providing the cache directory compare logic with an array having both a static and a dynamic output, where the static logic is used for the compare logic itself and the dynamic outputs are used by the ECC logic 100.

Directory compare and ECC logic provide good signal generation from on-chip array data for the ECC-compare path of a cache directory, when a three-output array provides a static output and a pair of complementary dynamic outputs. The static output is used by the compare logic for a directory compare. The pair of complementary dynamic outputs provide dynamic signals (t and f) to drive the ECC logic only as ECC logic complementary signals which are coupled to drive a DCVS (Dynamic Cascode Voltage Switch) syndrome generator circuit. The static output signal performs compare-then-correct processing. The dynamic signals of each bit emanating from array are ECC checked but the static signal is not. The static signal is consistent with the t dynamic signal. This processing speeds up good signal generation.

These and other improvements are set forth in the following detailed description. For a better understanding of the invention with advantages and features, refer to the description and to the drawings.

BRIEF DESCRIPTION OF THE DRAWINGS

The invention will be described in connection with the following FIGURES.

(Note: For convenience of illustration, FIGURES may be separated in parts and as a convention we place the top of the FIGURE as the first sheet, with subsequent sheets proceeding down and across when viewing the FIGURE, in the event that multiple sheets are used.)

DETAILED DESCRIPTION OF THE INVENTION

Figure 2:
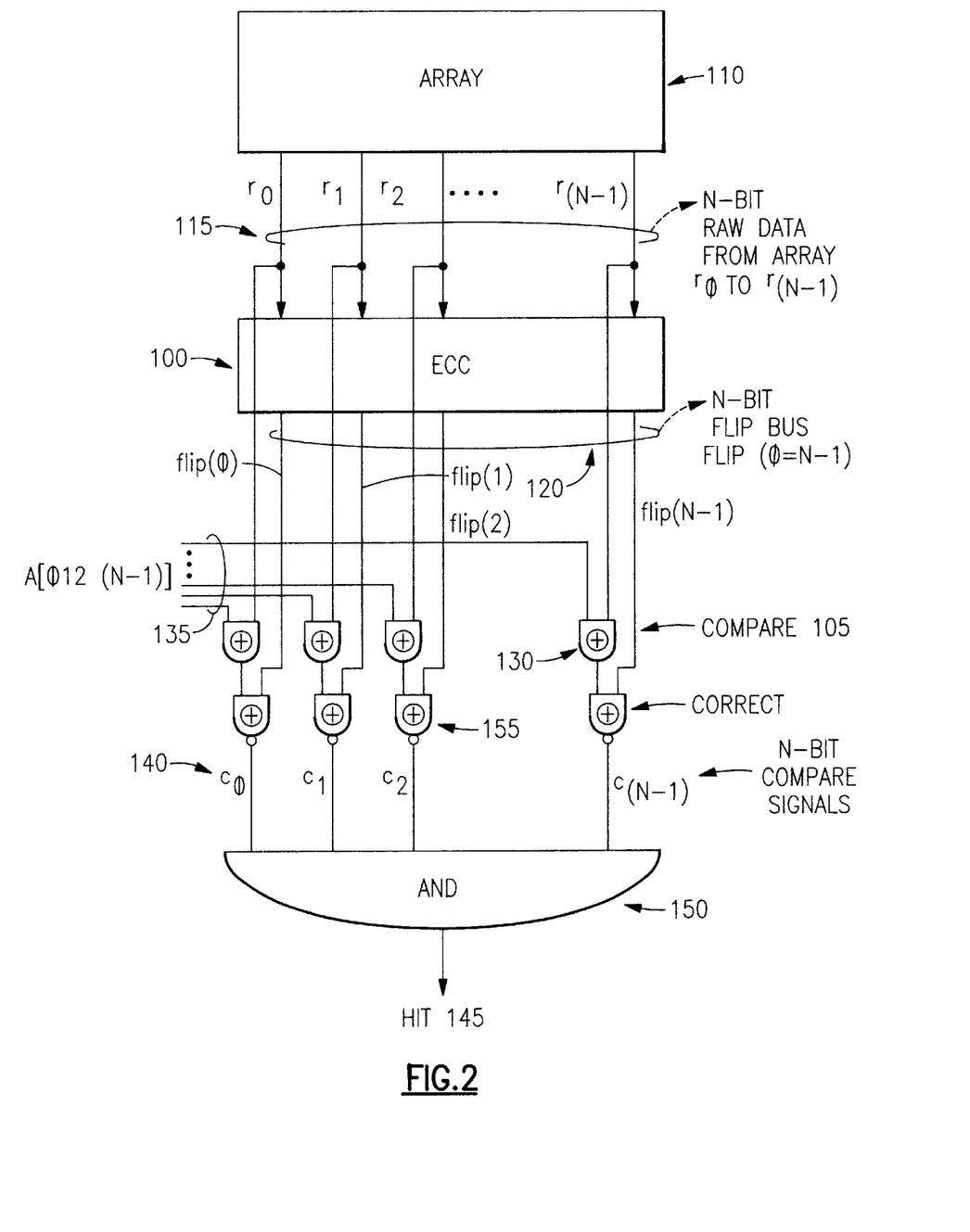
FIG. 2 shows directory compare logic with ECC using compare-then-correct method.

Before considering our preferred embodiments in detail, it may be worthwhile to illustrate, by way of example, that a first path for improvement at the time of generating good data which could be advantageous is to take the strategy of "compare-then-correct" as shown in FIG. 2 where error correction is done by exclusive-NOR gates 155.

Figure 3:
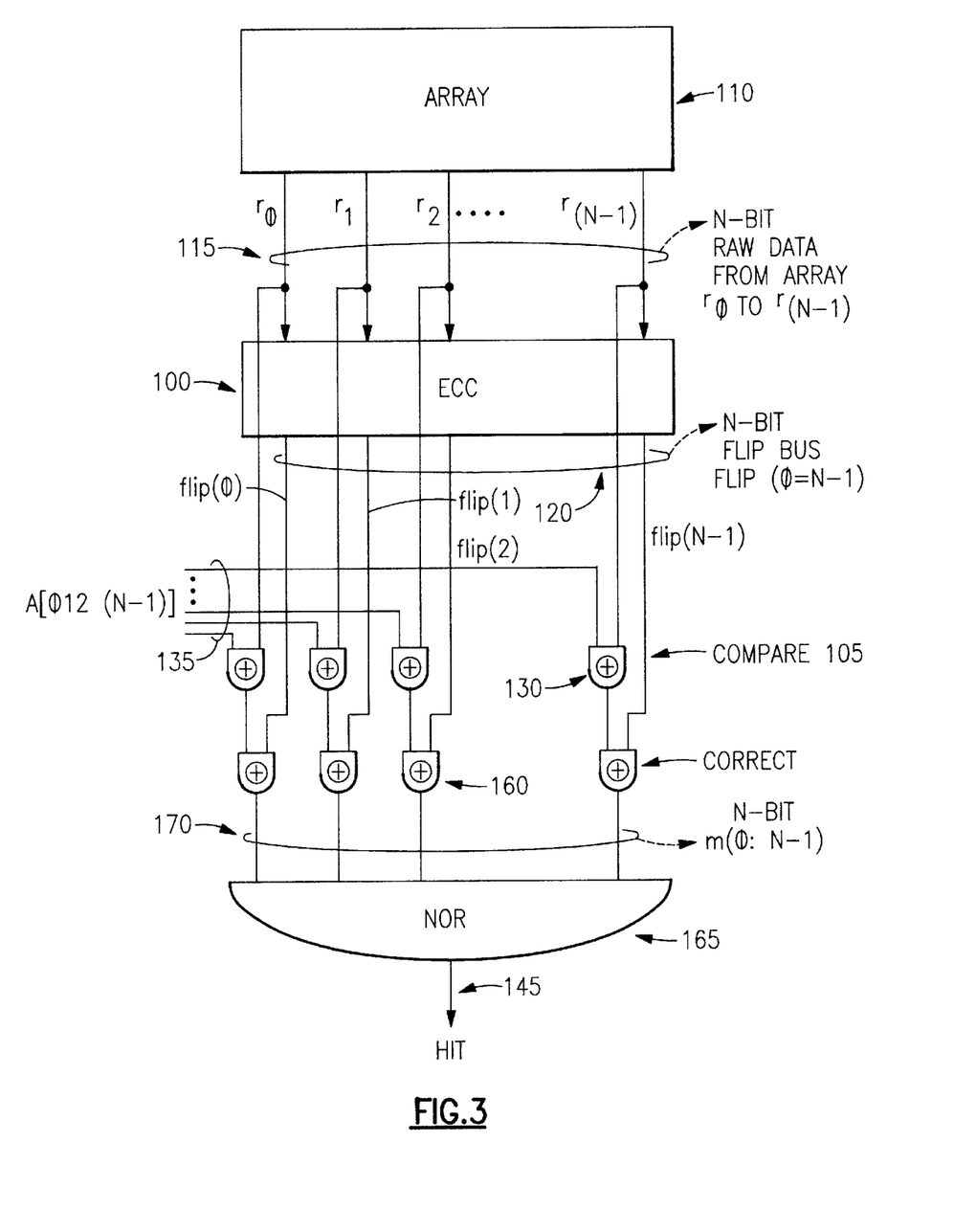
FIG. 3 shows a further improvement on the HIT signal generation.

Further improvement could be made, as is shown in FIG. 3 in which the AND gate 150 of FIG. 1 and FIG. 2 is replaced by NOR gate 165. The correction logic consists of a bank of Exclusive-OR gates 160. This NOR gate may be implemented in dynamic fashion, namely, having the output node 145 unconditionally precharged high and then conditionally discharged by one or more bits in the miss signals m(0:N−1) 170.

Figure 4:
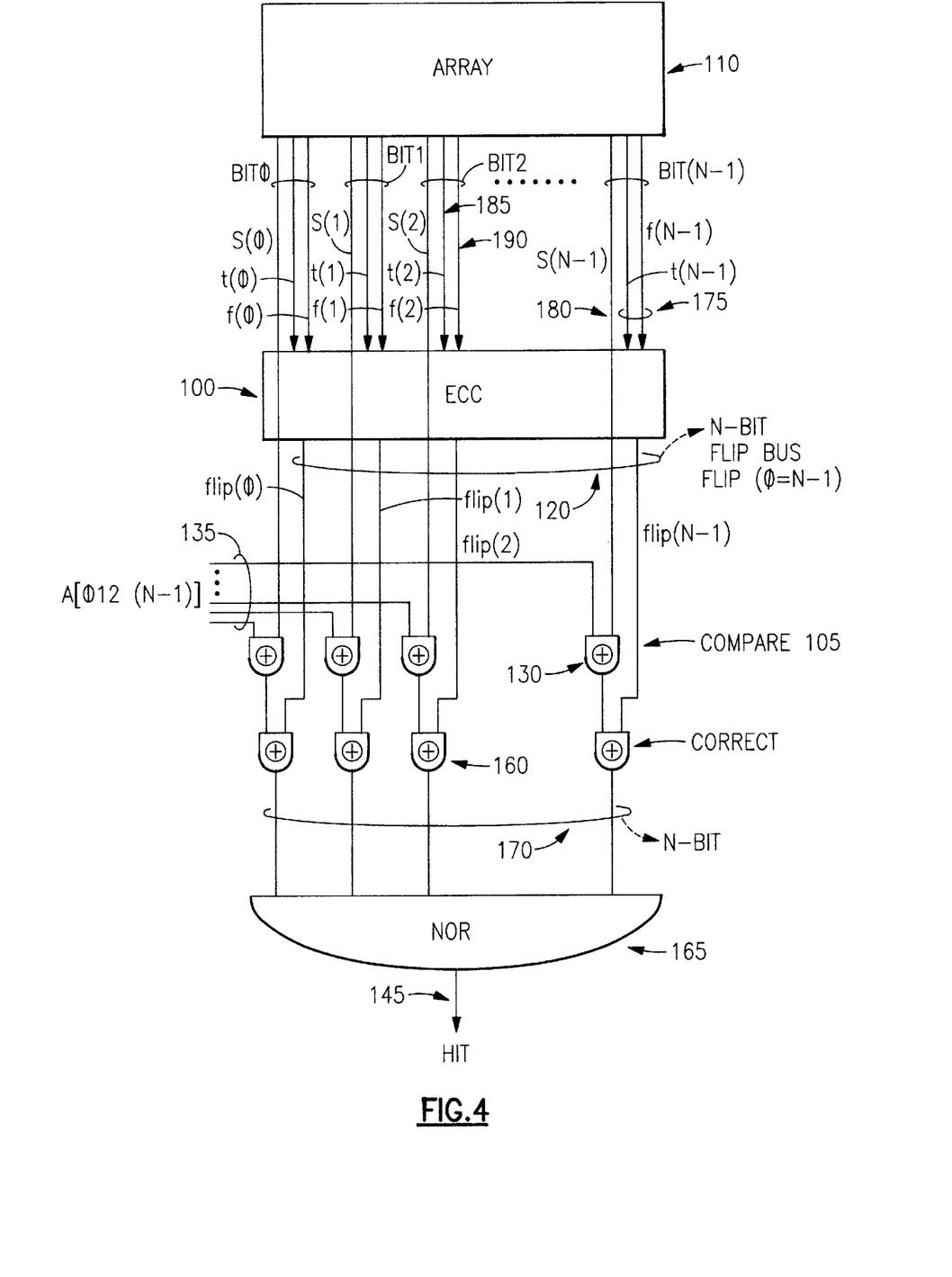
FIG. 4 illustrates the preferred embodiment of directory compare logic with an array having both static and dynamic outputs. Static output is used by the compare logic and dynamic outputs are used by the ECC logic.

In accordance with our preferred embodiment illustrated in FIG. 4, it is better to improve the ECC-compare path of the cache directory with directory compare logic with an array having both static and dynamic outputs. Static output is used by the compare logic while dynamic outputs are used by the ECC logic.

To elaborate, while array outputs shown in FIGS. 1 to 3 are static signals, in our preferred embodiment it is preferable to use an array that provides a static output and a pair of complementary dynamic outputs. There are such three-output arrays and they have been designed to give flexibility to the designers who are to design the downstream logic with performance in mind. However, in accordance with the teaching of this invention an improvement is obtained using the three-output array to shorten the critical path of the ECC/compare logic in directory design.

FIG. 4 shows a three-output array 110 which has been available by itself to provide true and complement dynamic outputs 175 and the static output 180 for a data bit. In the process of the preferred embodiment each bit of the array output has t, f, and s signals, where t stands for "true" signal 185, f stands for false or complementary signal 190, and s stands for static signal 180. These static signals 180 in accordance with the preferred embodiment are the static output used by the compare logic. Note that the ECC logic 100 interfaces with the (t, f) pairs 175 whereas the compare logic interfaces with the s signals 180. The ECC logic 100 in the preferred embodiment is implemented in fast dynamic fashion using DCVS (Dynamic Cascode Voltage Switch) circuits.

Figure 5:
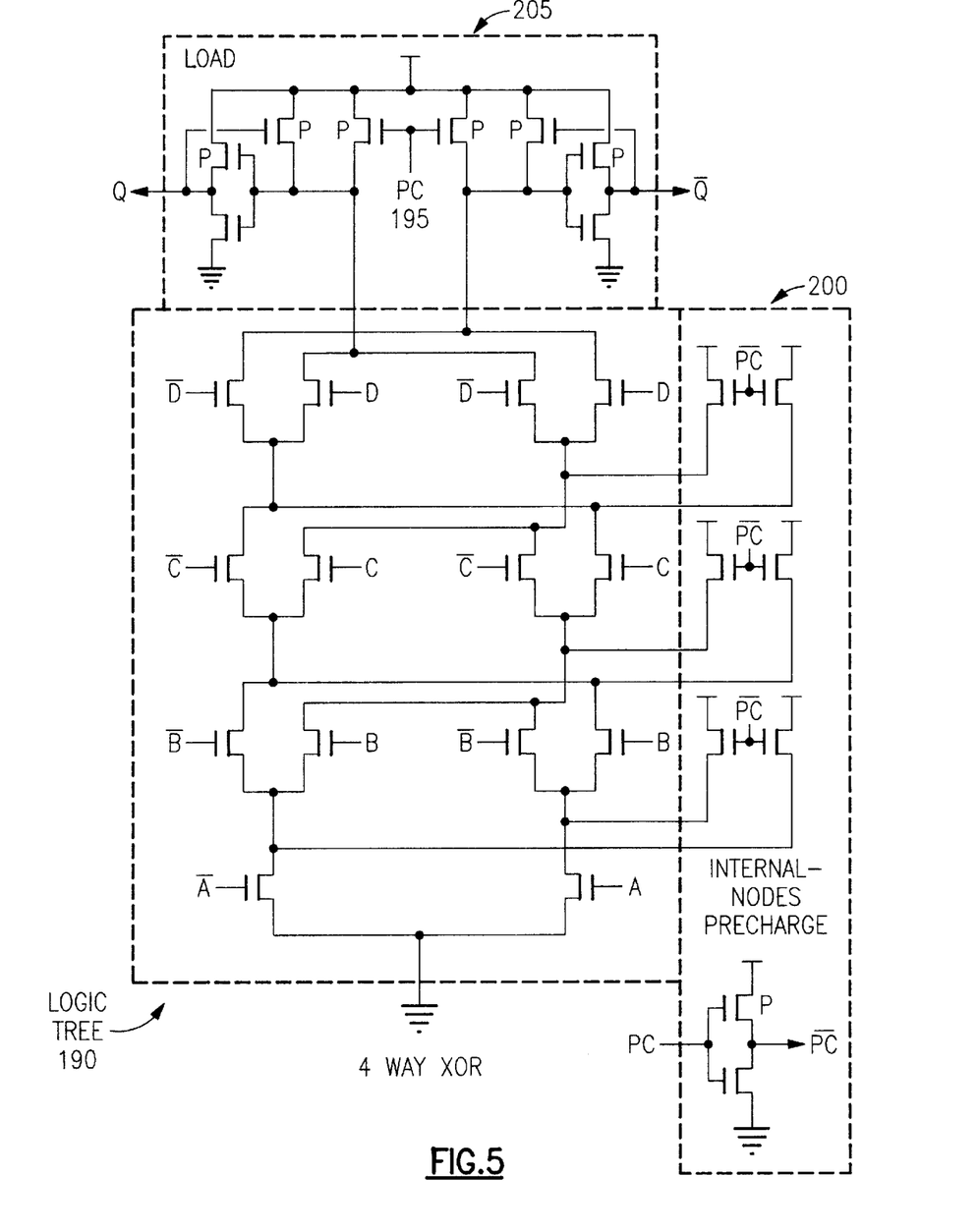
FIG. 5 illustrates a DCVS logic example using a four way XOR gate.

FIG. 4, using a conventional array 110 itself develops the invention with the circuit there illustrated which provides a speed improvement because:

1. The syndrome generation logic within the ECC function 100 requires true and complement inputs. The availability of symmetrical t and f signals 175 obviates any need to use inverters which add logic delay to the critical path.
2. The t and f signals 175 used in FIG. 4 are slightly faster than the raw data r(0:N-1) 115 shown in FIG. 3 and hence, gives the ECC logic 100 a head start.
3. In FIG. 3, the loading to each array output bit is higher because
   it drives the ECC 100 as well as the compare logic 105.
   it drives an inverter within ECC's syndrome generation circuit. In FIG. 4, the dynamic signals (t and f) 175 drive the ECC 100 only, without the burden of driving the compare logic 105 making the ECC work earlier. The static signal 180 is used to drive the compare logic 105. It is important to note that the static signal can be slower. A fast static signal offers no advantage because it has to wait for the arrival of the late flip(0:N-1) signals 120 anyway.
4. Dynamic signals t and f 175 are shaped in pulse form in standard a prior art array design, namely, they are normally low at the beginning of the array cycle and one of them goes high in form of short pulse at access time. This characteristic complements the use of DCVS logic for syndrome generation because the preferred DCVS logic (FIG. 5 shows an example) requires pulsed complementary input pairs. DCVS logic is faster than the static CMOS logic in a technology where the PMOS devices are considerably inferior than the NMOS devices.

FIG. 5 shows a preferred DCVS circuit implementation with a 4-way exclusive-OR gate complementing the syndrome vector generation logic which uses exclusive-OR extensively. This circuit is but one possible embodiment of the equivalent DCVS circuit used in a design which illustrates by example how DCVS works. The exact circuit implementation of the syndrome generation logic will depends on the H-Matrix that defines the ECC logic and that will be determined at the time of definition of the H-Matrix for the ECC logic a designer will use.

DCVS logic shown in FIG. 5 consists of three parts:
1. logic tree 190 comprises NMOS devices for fast discharge type logic evaluation when precharge clock PC 195 goes high. It receives complementary inputs: A and A-bar; B and B-bar; C and C-bar; and D and D-bar.
2. Internal nodes precharge 200 circuit prevents charge sharing.
3. Load 205 provides true and complement outputs, Q and Q-bar after PC 195 has gone high. When PC 195 is low (standby mode), all inputs to the tree 190 and outputs from the load 205 must be at ZERO state.

Figure 6:
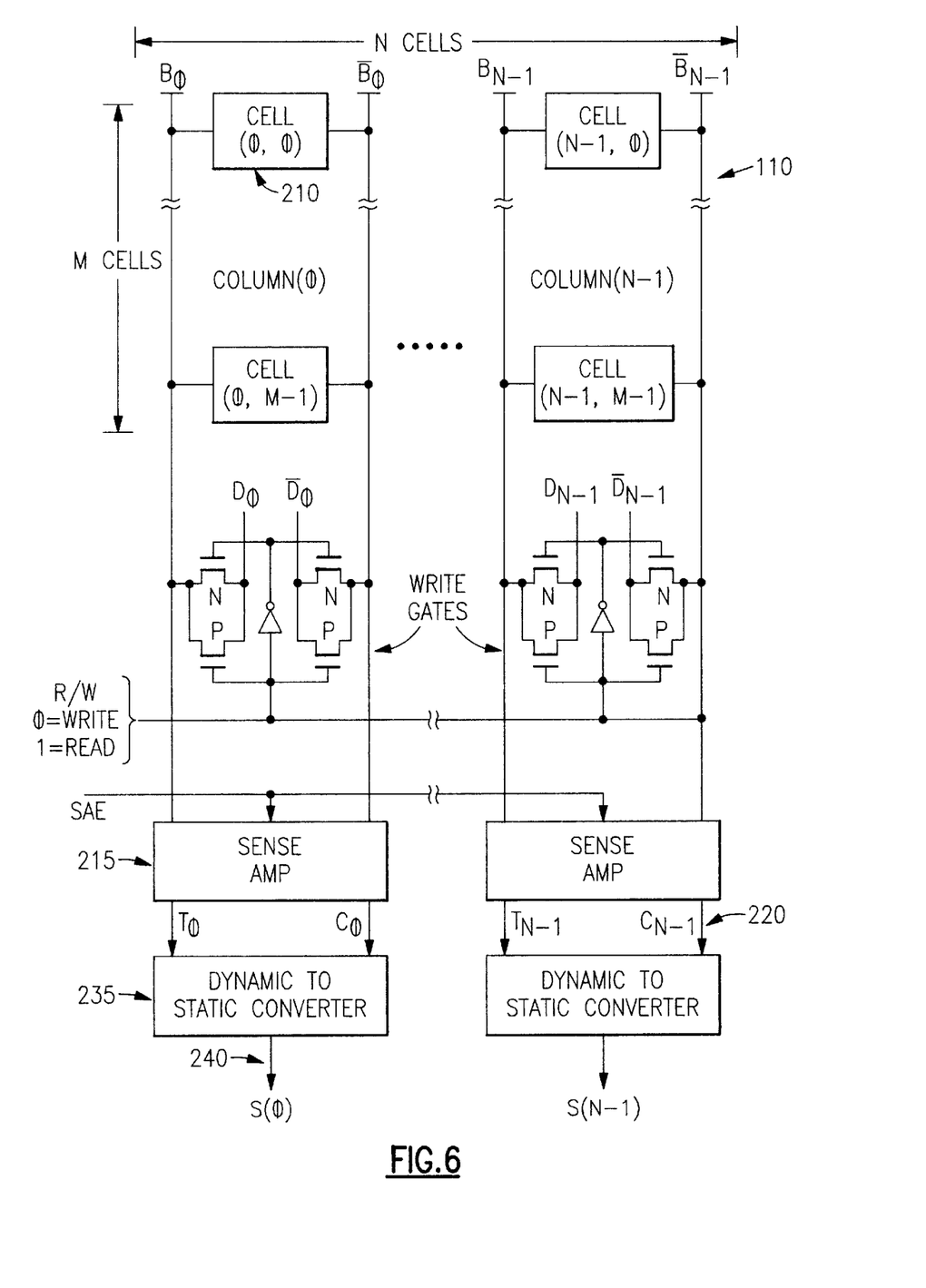
FIG. 6 illustrates a simplified array organization showing also the sense amplifiers and dynamic-to-static converter.

The internal structure of the conventional array 110 is shown in FIG. 6. Memory cells 210 are organized in M-rows by N-columns. Each column has a sense amplifier 215 which produces a pair of amplified complementary signals 220, T and C. The T/C pair feeds a "Dynamic-to-Static Converter" 235 which generates the static output 240 (same as 180 of FIG. 4) denoted as S.

In accordance with our preferred embodiment the logic driven by the array normally uses either the static output or a pair of dynamic outputs. This invention suggests that all three output signals are to be used. Specifically, in implementing the ECC-compare logic of the directory function, the dynamic pair is used to drive the syndrome generation of the ECC implemented in DCVS logic, whereas the static output is used to drive the compare-then-correct logic as has been shown in FIG. 4.

Figure 7:
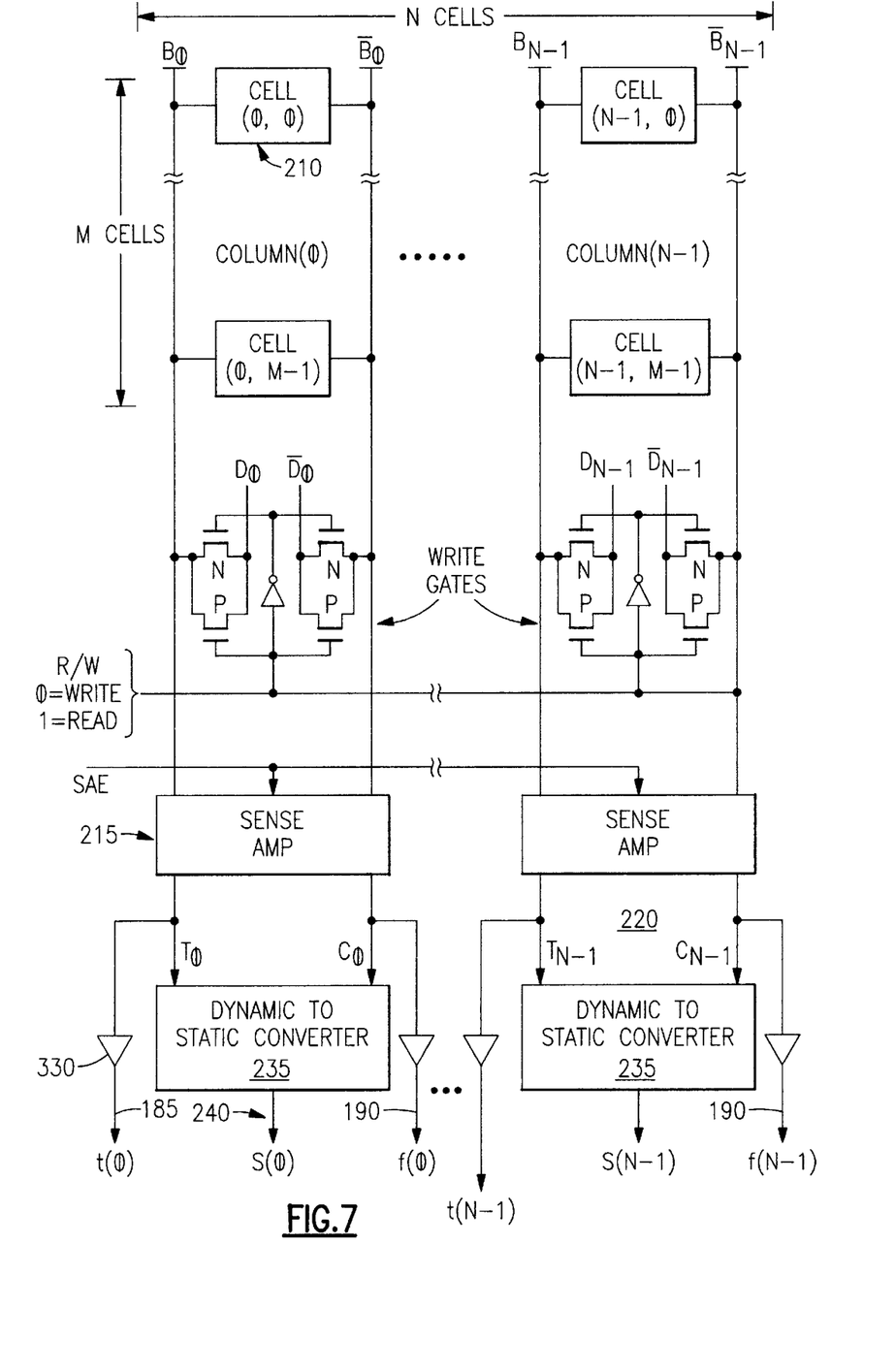
FIG. 7: array structure showing three output signals per bit.

In FIG. 7, the sense amplifier outputs 220 are used either directly as dynamic outputs, or indirectly through buffers 330 to generate a pair of dynamic outputs which consists t 185 and f 190. As a result, each output bit of the array consists of three signals: t, f, and S (185, 190, 240) as shown in in FIG. 7. The significance of the previous discussion concerning FIG. 4 should now be appreciated.

Refer to FIG. 7. Since the S signal 240 (same as 180 in FIG. 4) is generated from the T and C signals 220, it is conceivable that output signals t 185 and f 190 can be made faster than the S signal 240. Also, the t and f signals are symmetrical because they are outputs of the symmetrical differential sense amplifier 215. The inverter delay associated with syndrome generation logic within the ECC logic in the prior art is eliminated by the provision of the differential outputs 185 and 190.

Referring to FIG. 4 the dynamic signals t 185 and f 190 of each bit from array 110 are ECC checked but the static signals S 180 is not. It is important that the static signal, S 180, must be consistent with the t signal 185. What is not shown in FIG. 7 are the MISR (Multiple Input Shift Register) which is a test pattern signature generator and the ABIST (Array Built-In Self Test) which is the on-chip tester, see U.S. Pat. Nos. 5,659,551 and 5,661,732. The signature generated by MISR via the ABIST determines whether the array is good or not during test mode. The Dynamic-to-Static converter 235 usually contains part of the MISR as previously illustrated.

FIG. 7 shows that the static signal S 180 is generated from the T and C signals 220. These static signals S 180 which participate in MISR signature generation. If the MISR yields a good signature, the T and C signals must be correct. Using this information known to be correct insures the static output 240 will be consistent with the dynamic outputs 220.

While we have described our preferred embodiments of our invention, it will be understood that those skilled in the art, both now and in the future, may make make various improvements and enhancements which fall within the scope of the claims which follow. These claims should be construed to maintain the proper protection for the invention first disclosed.

What is claimed is:
1. Directory compare and ECC logic which is interfaced with the array's static and dynamic outputs for the ECC-compare path of a cache directory, comprising:
   a three-output array for the ECC/compare path of said cache directory, said
   array providing a static output and a pair of complementary dynamic outputs, said
   static output being provided to compare logic for a directory compare, and said pair of complementary dynamic outputs being provided as the dynamic signals (t and f) to drive the ECC logic only as ECC logic complementary signals coupled to drive a DCVS (Dynamic Cascode Voltage Switch) syndrome generator circuit, said static output signal being used to perform compare-then-correct processing with said logic.

2. Directory compare and ECC logic according to claim 1 wherein said dynamic signals t and f 175 are shaped in pulse form and normally low at the beginning of an array cycle after which one of the dyanmic signals goes high in form of short pulse at access time, said pair of dynamic signals providing pulsed signals for use by said DCVS syndrome generation circuit as complementary input pairs to said DCVS logic.

3. Directory compare and ECC logic according to claim 2 wherein said DCVS syndrome generation circuit has a 4-way exclusive-OR gate complementing the syndrome vector generation logic which uses exclusive-OR logic.

4. Directory compare and ECC logic according to claim 3 wherein said dynamic signals of each bit emanating from array are ECC checked but the static signal is not, said static signal being consistent with the true dynamic signal.

* * * * *